United States Patent
Dalla Valle

(10) Patent No.: US 7,517,483 B2
(45) Date of Patent: Apr. 14, 2009

(54) PROCESS FOR MANUFACTURING REINFORCED TILES OR PANELS OF AGGLOMERATED MATERIAL WITH A METALLIC PLATE AS WELL AS PRODUCT OBTAINED THROUGH SAID PROCESS

(75) Inventor: Roberto Dalla Valle, Bussolengo (IT)

(73) Assignee: Stone Italiana SpA, Verona (IT)

( * ) Notice: Subject to any disclaimer, the term of this patent is extended or adjusted under 35 U.S.C. 154(b) by 318 days.

(21) Appl. No.: 10/511,255

(22) PCT Filed: Apr. 11, 2003

(86) PCT No.: PCT/IT03/00225

§ 371 (c)(1),
(2), (4) Date: Aug. 26, 2005

(87) PCT Pub. No.: WO03/084725

PCT Pub. Date: Oct. 16, 2003

(65) Prior Publication Data
US 2006/0019067 A1 Jan. 26, 2006

(30) Foreign Application Priority Data
Apr. 11, 2002 (IT) .......................... VR2002A0035

(51) Int. Cl.
*B29C 43/20* (2006.01)
(52) U.S. Cl. .................. 264/112; 264/115; 264/122
(58) Field of Classification Search .................. None
See application file for complete search history.

(56) References Cited

U.S. PATENT DOCUMENTS

| 4,640,854 A | 2/1987 | Radtke ......................... 428/35 |
| 4,833,845 A | 5/1989 | Bruckner et al. ........... 52/126.6 |
| 4,945,701 A | 8/1990 | Bell et al. ...................... 52/601 |
| 5,057,355 A | 10/1991 | Klingelhofer et al. ....... 428/192 |
| 6,355,191 B1 * | 3/2002 | Toncelli ..................... 264/40.4 |
| 6,387,985 B1 * | 5/2002 | Wilkinson et al. ........... 523/171 |
| 6,846,552 B2 * | 1/2005 | Dalla Valle ................. 428/220 |

FOREIGN PATENT DOCUMENTS

| BE | 404 120 | 8/1934 |
| GB | 873 283 | 7/1961 |
| IT | 01268312 | 10/1989 |
| WO | WO 01/60590 | * 8/2001 |

OTHER PUBLICATIONS

International Search Report dated Aug. 27, 2003.

* cited by examiner

*Primary Examiner*—Mary Lynn F Theisen
(74) *Attorney, Agent, or Firm*—Greenberg Traurig, LLP

(57) ABSTRACT

A procedure for the production of sheets or tiles (10) in agglomerate material consisting of products comprising marble and/or granite and/or sand and/or quartz powders and binding resins, also comprising possible inclusions of elements made from metal, glass, ceramic, wood, precious stones, comprising the following processing stages: a) crushing of the components of the sheets or tiles (10); b) mixing of these components with the aforesaid binding resins; c) pressing and compacting of these components inside a pressing die, and hardening at a predetermined pressure and temperature, in order to obtain a predetermined shape, advantageously quadrangular, and predetermined dimensions of these sheets or tiles (10); and according to which before stage c) is carried out a metal plate (11) is positioned inside the pressing die and presents an irregular structure designed to accommodate the mixture of the components which, during the polymerisation and hardening stages, bond to the plate (11) thus forming the base of the sheet or tile (10).

11 Claims, 1 Drawing Sheet

PROCESS FOR MANUFACTURING REINFORCED TILES OR PANELS OF AGGLOMERATED MATERIAL WITH A METALLIC PLATE AS WELL AS PRODUCT OBTAINED THROUGH SAID PROCESS

This application is a national stage filing of International Application No. PCT/IT03/00225 with international filing date of 11 Apr. 2003. The international application claims priority of Italian Application No. VR 2002A000035 filed 11 Apr. 2002.

TECHNICAL FIELD

The present invention concerns a procedure for the production of sheets or tiles made from agglomerate material, in particular a material generally consisting of marble and/or quartz and/or sand and/or binding resins and/or granite-based mixtures, also comprising possible intrusions of various kinds, such as elements in metal, glass, wood, etc., these sheets or tiles being equipped with a metal reinforcement plate positioned on the lower surface.

The invention also refers to sheets or tiles manufactured according to this procedure.

The invention applies mainly to the industrial processing field of marble, stone, granite and the like.

BACKGROUND ART

Sheets or tiles in agglomerate material presenting an internal reinforcement structure are frequently used for laying so-called raised or floating floors in which the sheets or tiles are positioned on top of an appropriate wire grid which is raised with respect to the ground thus making it possible to obtain a hollow space with a predetermined height, allowing the laying of large quantities of electrical and/or hydraulic ducting and their easy maintenance or modification.

While on one hand raised or floating floors present considerable advantages, including those described above, on the other they involve a series of drawbacks which limit their construction and use or make them difficult.

A first drawback presented by raised or floating floors made from composite material is due to the fact that these floors are usually electrically ground-insulated.

This implies an unfavourable accumulation of electrostatic charges on objects which are present on or which move on this floor, an effect which is unacceptable for numerous precision electronic devices but which may be even more simply disadvantageous if these electrostatic discharges involve the people who walk across the floor.

A further limitation usually involved in the construction of raised or floating floors consists of the fact that the sheets must directly support the weight of considerable loads and must therefore be fairly thick in order to withstand maximum breaking loads in compliance with safety regulations.

All this inevitably means not only great structural and working limitations but also high costs and lengthy and difficult laying times for these floors.

The Italian document VR94A000068 describes a procedure for the production of sheets made from agglomerate material comprising a series of processing stages, specifically:

an initial stage consisting of the crushing of the various materials making up the agglomerate;

a second stage consisting of the mixing of the crushed materials in order to obtain a product which is as homogeneous as possible, during which the binding resins are added;

a third stage consisting of the pressing and compacting of the agglomerate during which the required shape is obtained and in which a wire or fibre mesh is buried, this being formed by a plurality of wires arranged according to a predetermined layout and whose ends are situated at the same level as or protrude beyond the lower surface of the sheet;

a fourth stage in which the sheet is hardened at a predetermined temperature;

a fifth stage in which at least one side of the sheet is smoothed and polished;

a sixth stage in which the sheet is cut to size, chamfered, gauged and flared, followed by unloading of the end products.

A procedure such as the one described above makes it possible to obtain sheets made from agglomerate material, with precisely predetermined lengths, widths and thicknesses, and which is performed in a continuous process on a specially designed plant.

In spite of the presence of the wire-mesh consisting of wires as described above, the previously mentioned disadvantages are still present, particularly as regards the electrostatic charge.

In fact, during the hardening stage the resin envelops the metal surface of the wires forming the reinforcement mesh, creating an insulation film which does not permit effective discharge of the accumulated electrostatic charge.

Document U.S. Pat. No. 4,640,854 discloses a composite plate for double floors comprising a pan-shaped wrapper for receiving therein a flowable and hardenable filler material. The wrapper comprises a plurality of downwardly extending projecting blocks containing the filler material.

Documents U.S. Pat. Nos. 4,833,845 and 5,057,355 disclose a metallic shallow pan serving for the production of a self-supporting composite plate, wherein the pan forms the outside wrapper for a filler with high compression resistance such as anhydrite.

DESCRIPTION OF THE INVENTION

The present invention aims to overcome the above-mentioned drawbacks and disadvantages, and to therefore provide a procedure which allows the production of sheets or tiles made from agglomerate material designed to be advantageously used in laying floating floors.

This is achieved by implementing the features described in the main claim.

The dependent claims describe particularly advantageous forms of embodiment of the procedure according to the invention.

Finally, claim 5 describes a sheet or tile made from agglomerate material advantageously obtained by means of the procedure according to the invention.

According to a fundamental feature of the invention, a metal plate is positioned inside the tile or sheet. The structure of this plate is the result of the processing of a laminar element, obtained for example by die forming, presenting an irregular structure for example with cavities and protuberances designed to accommodate the agglomerate mixture which, during the polymerisation and hardening stage, binds to the plate which is therefore either embedded in the sheet or tile or forms the base thereof.

As far as the other stages of the procedure are concerned, there are no technically significant variations with respect to what is already known and the end result is a tile or sheet reinforced with a metal plate which is embedded in its structure, or covers its lower surface to form a single object.

The use of this type of tile or sheet makes it possible to resolve the problems mentioned above, typical of background art.

When using the sheets or tiles to lay raised or floating floors, the metal reinforcement plates can be connected to each other, thus allowing a continuous and precise ground-discharge of the electrostatic charge generated on the surface of the floor or of the objects in contact with the floor, preventing the discharges from damaging the equipment or affecting the people walking across the floor.

In fact thanks to the particular structure of the metal plate and its extensive surface, although the resin contained in the mixture forming the agglomerate binds to the plate during the polymerisation and hardening stage, also due to the presence of elements that make its surface irregular and allow an excellent adherence of the mixture, it does not lead to the formation of an insulating film as in the solutions known to background art.

DESCRIPTION OF THE DRAWINGS

Other features and advantages of the invention will become evident on reading the following description, given as a non-binding example, with the help of the enclosed drawings, in which.

DESCRIPTION OF A FORM OF EMBODIMENT

Figure 1:
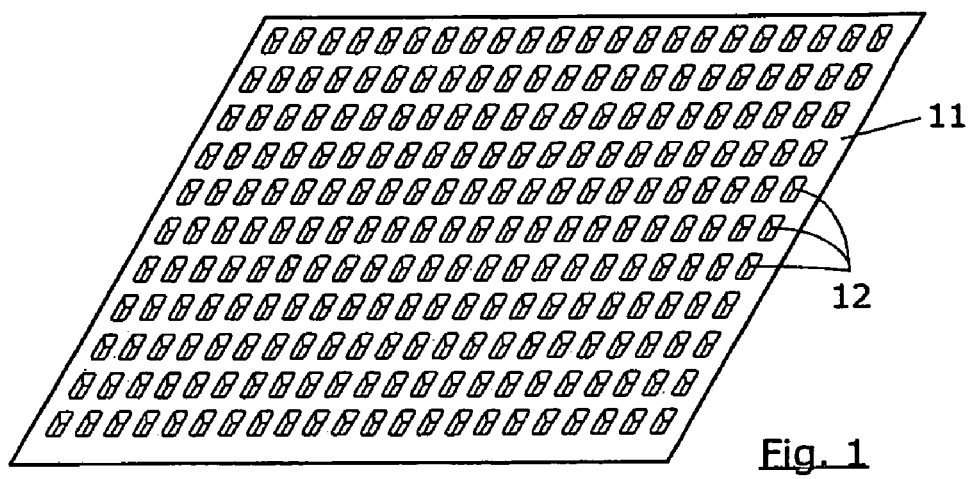
FIG. 1 a metal plate according to an embodiment of the present invention.
Figure 2:
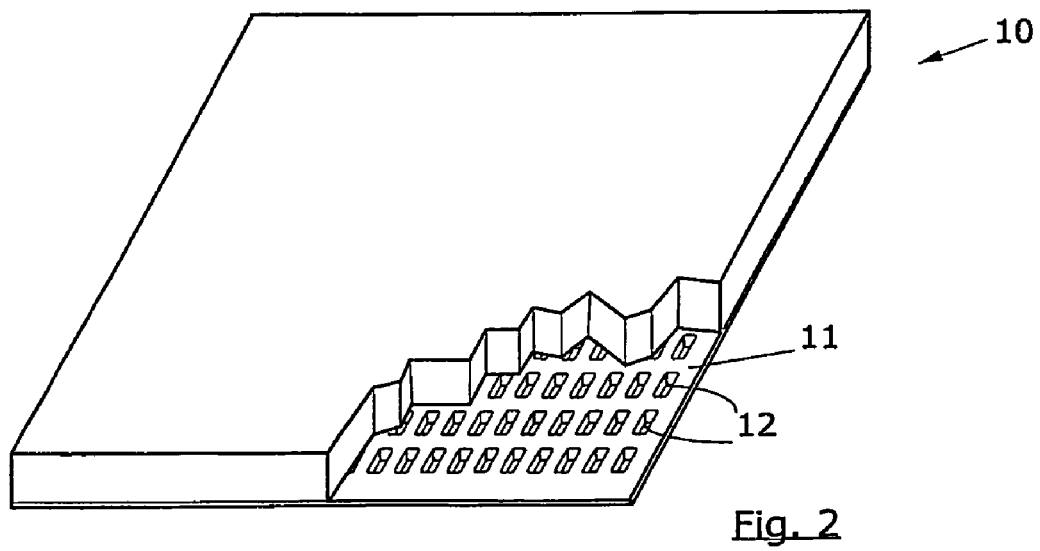
FIG. 2 shows a perspective view from above, partially in cross-section, of a sheet or tile according to an embodiment of the present invention.
Figure 3:
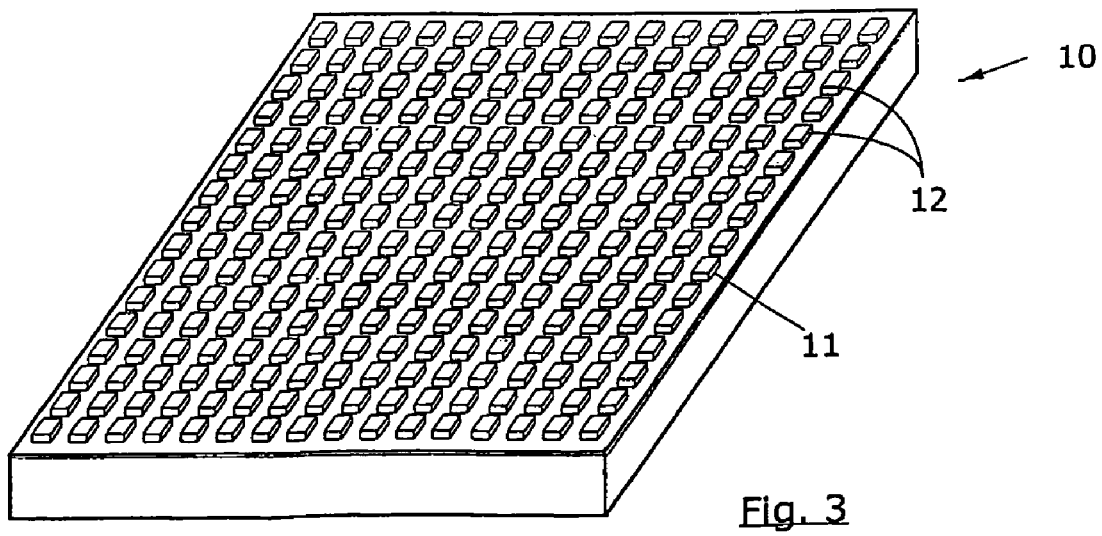
FIG. 3 shows a perspective view from below, of the base of the sheet or tile according to FIG. 2.

In the figures, the reference number 10 generally indicates a sheet or tile made from stone agglomerated material, manufactured by means of the procedure according to this invention.

The materials normally used for the production of sheets or tiles 10 of this type comprise a variety of mixtures such as for example marble of different types or colours bonded by resins, marble bonded with predetermined percentages of quartz, sands bonded with binding resins and various other possibilities widely known to the background art.

The procedure for manufacturing the sheets or tiles 10 is typically carried out on an automated plant controlled by a computerised system in the various processing stages.

The first stage of the procedure foresees the crushing of the various components in order to achieve the required granulometry, particularly when marble, granite or quartz are used.

In the second stage the crushed products are mixed together in a special mixing machine and an appropriate synthetic resin acting as a binder is added.

In the third stage the mixture is poured into a die of a press. The action of the press on the mixture, together with the activation of a vibrator device and a vacuum device, makes it possible to model a sheet or tile according to a predetermined shape, thickness and density, and with a homogeneous structure free of gas or air bubbles.

According to a form of embodiment of the present invention, a metal plate 11 is positioned on the bottom of the pressing die before the mixture to be pressed is poured into the die.

Once the pressing and hardening has been carried out, the metal plate 11 constitutes a single object with the sheet or tile 10, forming the lower surface.

The subsequent stages of the procedure are then carried out in the traditional way.

The sheet or tile 10 is first conveyed inside a kiln in which the polymerisation of the synthetic resin and the consequent hardening of the sheet or tile rake place, with particular temperature conditions and hardening times, well known to experts in the sector.

On leaving the kiln, the sheet or tile 10 is conveyed towards the next processing stations for the subsequent smoothing and polishing of the upper surface, the cutting to size according to the required shape, the chamfering, gauging and flaring operations, and then to any waxing, drying and packaging stations.

The above description shows that the procedure according to this invention differs from what is already known to the background art by the insertion of a metal plate during the product pressing stage.

This particular solution makes it possible to obtain an end product with completely new features with respect to what is already known.

In fact, the insertion of the plate makes it possible to completely discharge any electrostatic charge accumulated on the sheet or tile by connecting it to ground electrically or by connecting the entire floor once the various sheets or tiles of which it consists are connected to each other as in the case of a raised floor.

This particular ability to discharge the electrostatic current is made possible by the presence of the plate and its extensive contact surface with the conductor elements inside the agglomerate structure.

The metal plate 11 according to this invention can be obtained for example from an element die-formed or rolled in such a way as to present a series of cavities or protuberances which allow excellent adherence of the resin to the plate.

In FIG. 1 these cavities are represented by elements 12 which expand from the bottom of the plate. According to other variations, not shown in the drawings, these cavities can also be knurled or rippled, or protuberances or elements protruding towards the mixture forming the agglomerate.

According to a particular embodiment of the invention, the metal plate can be made from aluminium.

The other considerably important function of the metal plate 11 is to reinforce the sheet or tile 10 giving it a much higher breaking load compared with a sheet of the same size constructed according to known techniques.

This means that sheets or tiles 10 much thinner than traditional ones but with the same required breaking load can be used to lay a floor.

For example, according to this invention it is possible to use sheets or tiles with a thickness of between 10 and 20 mm to construct raised or floating floors and with a breaking load which is the same as that of traditional panels, sheets or tiles, which are normally at least 30-35 mm thick.

As already mentioned above, the possibility of using thinner sheets or tiles means less material, less weight, easier laying and, basically, a remarkable saving in costs, despite the insertion of the metal plate.

The invention is described above with reference to a preferred form of embodiment.

It is nevertheless clear that the invention is not limited to this form of embodiment but is also susceptible to numerous variations with the same aims, within the framework of technical equivalents. For example, the metal plate can easily be inserted in the die after having poured a given quantity of material inside the die. In this case the final product is a tile or sheet where the metal plate is not forming the base thereof, and it is rather embedded in the tile or sheet. The same technical results as mentioned above, in what concerns discharging electrostatic charges and raising the breaking load of the tile or sheet, are achieved.

The invention claimed is:

1. A method for the production of sheets or tiles in agglomerate material comprising at least one of a marble component, a granite component, a sand component, and a quartz component, and further including binding resins, the method comprising the steps of:
   crushing the components of the sheets or tiles;
   mixing the components with the aforesaid binding resins to form a mixture;
   positioning a metal plate inside a pressing die, the metal plate defined by a top face, a bottom face, and side walls between the top face and bottom face, the metal plate having a structure comprising a series of cavities suitable for receiving the mixture of the components;
   pouring the mixture inside the pressing die;
   pressing and compacting the mixture; and
   hardening the mixture such that the components bond to the metal plate to form a single object with the sheet or tile, the mixture hardened at a predetermined pressure and temperature, in order to obtain a predetermined shape, advantageously quadrangular, and predetermined dimensions of these sheets or tiles.

2. The method of claim 1, wherein the metal plate is obtained by die-pressing or rolling.

3. The method of claim 1, further comprising:
   smoothing and polishing of at least one of the upper and/or lower surfaces of these sheets or titles; and
   cutting to size, chamfering, gauging and flaring of these sheets or tiles.

4. The method of claim 1, wherein the agglomerate material further comprises inclusions of elements made from metal, glass, ceramic, wood, or precious stones.

5. The method of claim 1, wherein the top face of the metal plate has a flat outer perimeter surrounding the cavities.

6. The method of claim 1, wherein the hardened mixture completely covers the top face of the metal plate.

7. A method for the production of sheets or tiles in agglomerate material that eliminate electrostatic charges, the agglomerate material comprising at least one of a marble component, a granite component, a sand component, and a quartz component, and further including binding resins, the method comprising the steps of:
   crushing the components of the sheets or tiles;
   mixing the components with the aforesaid binding resins to form a mixture;
   positioning a metal plate inside a pressing die, the metal plate having a structure comprising a series of cavities suitable for receiving the mixture of the components;
   pouring the mixture inside the pressing die;
   pressing and compacting the mixture; and
   hardening the mixture such that the components bond to the metal plate to form a single object with the sheet or tile, the mixture hardened at a predetermined pressure and temperature, in order to obtain a predetermined shape, advantageously quadrangular, and predetermined dimensions of these sheets or tiles.

8. A method for the production of sheets or tiles in agglomerate material comprising at least one of a marble component, a granite component, a sand component, and a quartz component, and further including binding resins, the method comprising the steps of:
   crushing the components of the sheets or tiles;
   mixing the components with the aforesaid binding resins to form a mixture;
   positioning a metal plate inside a pressing die, the metal plate defined by a top face, a bottom face, and side walls between the top face and bottom face, the metal plate having a structure comprising a series of cavities suitable for receiving the mixture of the components and a flat outer perimeter on the top face surrounding the series of cavities;
   pouring the mixture inside the pressing die such that the mixture completely covers the top face of the metal plate;
   pressing and compacting the mixture; and
   hardening the mixture such that the components bond to the metal plate to form a single object with the sheet or tile, the mixture hardened at a predetermined pressure and temperature, in order to obtain a predetermined shape, advantageously quadrangular, and predetermined dimensions of these sheets or tiles.

9. The method of claim 1, wherein the side walls have top and bottom ends, the top and bottom ends being flush with the top and bottom faces respectively.

10. The method of claim 1, wherein the side walls do not extend above the top face of the metal plate.

11. The method of claim 1, wherein the top face and bottom face ends at a top and bottom extremity of the side walls.

* * * * *